United States Patent
Zhu et al.

(10) Patent No.: US 7,494,951 B2
(45) Date of Patent: Feb. 24, 2009

(54) PROCESS FOR THE MANUFACTURE OF CATALYSTS USED FOR PRODUCING PARA-XYLENE BY TOLUENE SHAPE SELECTIVE ALKYLATION

(75) Inventors: Zhirong Zhu, Shanghai (CN); Dejin Kong, Shanghai (CN); Weimin Yang, Shanghai (CN); Qingling Chen, Shanghai (CN); Wei Zou, Shanghai (CN); Wei Li, Shanghai (CN); Min Hou, Shanghai (CN); Deqin Yang, Shanghai (CN)

(73) Assignees: China Petroleum & Chemical Corporation, Beijing (CN); Shanghai Research Institute of Petrochemical Technology Sinopec, Shanghai (CN)

( * ) Notice: Subject to any disclaimer, the term of this patent is extended or adjusted under 35 U.S.C. 154(b) by 324 days.

(21) Appl. No.: 11/503,184

(22) Filed: Aug. 14, 2006

(65) Prior Publication Data
US 2007/0037693 A1 Feb. 15, 2007

(30) Foreign Application Priority Data
Aug. 15, 2005 (CN) .................. 2005 1 0028770
Aug. 15, 2005 (CN) .................. 2005 1 0028771

(51) Int. Cl.
*B01J 29/06* (2006.01)
(52) U.S. Cl. ............... 502/60; 502/77; 502/64; 502/76; 502/71; 502/62
(58) Field of Classification Search ............ 502/60, 502/62, 64, 71, 77, 76
See application file for complete search history.

(56) References Cited

U.S. PATENT DOCUMENTS

| | | | | |
|---|---|---|---|---|
| 4,707,345 A | * | 11/1987 | Lok et al. | 423/704 |
| 5,250,282 A | * | 10/1993 | Kresge et al. | 423/705 |
| 5,367,099 A | | 11/1994 | Beck et al. | |
| 5,607,888 A | | 3/1997 | Chang et al. | |
| 6,486,373 B1 | | 11/2002 | Abichandani et al. | |

* cited by examiner

*Primary Examiner*—Elizabeth D Wood
(74) *Attorney, Agent, or Firm*—Birch, Stewart, Kolasch & Birch, LLP

(57) ABSTRACT

The present invention relates to a process for the manufacture of catalysts used for producing para-xylene by toluene shape selective alkylation. The invention is primarily used for solving the problems in the old technology, e.g., high requirements on the environment and great treatment of waste water containing organic amines when synthesizing ZSM-5 molecular sieves by using an organic amine as the template agent; small and non-homogeneous particles of the molecular sieves when synthesizing ZSM-5 molecular sieves by using an alcohol or ether as the template agent, such that the catalyst prepared thereby has low catalytic selectivity and low toluene conversion rate, etc. Said problems are better solved in the present invention by synthesizing ZSM-5 molecular sieves using the combination of organic amines and alcohols or ethers as the template agents (having a weight ratio of organic amines/alcohols=0.05-150, and organic amines/ethers=0.05-150), and modifying with organosilicon so as to obtain the catalysts. Said catalysts can be used in the industrial production of para-xylene manufactured by toluene shape selective alkylation.

7 Claims, No Drawings

PROCESS FOR THE MANUFACTURE OF CATALYSTS USED FOR PRODUCING PARA-XYLENE BY TOLUENE SHAPE SELECTIVE ALKYLATION

TECHNICAL FIELD

The present invention relates to a process for the manufacture of catalysts used for producing para-xylene by toluene shape selective alkylation.

BACKGROUND OF THE INVENTION

Shape selective alkylation of toluene is one of highly valuable reactions in the industrial development because it can convert toluene to para-xylene having higher practical value, and can make the reaction system selectively produce para-xylene. ZSM-5 molecular sieves are currently used in most of relevant patents as the reaction body. ZSM-5 zeolites have a three-dimensional pore channel system consisting of 10-membered silicon oxygen rings. The pore diameter of ZMS-5 zeolites enables rapid diffusion of para-xylene having a molecular diameter of 0.63 nm, while ortho-xylene and meta-xylene having a molecular diameter of 0.69 nm have a much lower diffusion coefficient. In the toluene shape selective alkylation reaction system, the diffusion coefficients of various substances in ZSM-5 pore channels are in a sequence of toluene >ethyl benzene≈para-xylene>ortho-xylene≈meta-xylene. Such a fact means the possibility of the shape selection for the shape selective alkylation reaction of toluene. That is to say, the para-xylene isomer content greatly higher than thermodynamic equilibrium concentration in the xylene products can be obtained. However, the isomerization reaction rate at the external surface acidic position that has no selectivity to the enriched para-product diffused from the pore channel is far greater than the disproportionation rate, such that the final products reach a balanced composition soon. Although studies show that some certain selectivity can also be obtained by using ZSM-5 having large crystal particle size under the conditions of high space velocity and low conversion rate, it has no practical value. In conclusion, it is necessary to modify the external surface of ZSM-5. Moreover, the silica/alumina ratio, crystal size and shape of ZSM-5 molecular sieves will directly have an effect on the surface modification effects of the molecular sieves, so as to determine the performance index of the catalysts to a great extent.

U.S. Pat Nos. 5,367,099 and 5,607,888 disclose preparing selective toluene alkylating catalysts by modification of ZSM-5 molecular sieve structure, i.e., decreasing the opening size of the pore, and shielding the acidic activity position of the external surface. ZSM-5 molecular sieves used in said U.S. patents are synthesized with the organic amine template agent system. The organic amine template agent has advantages of fast crystallization rate and broad range of the structural silica/alumina ratio. Although the toluene selective alkylating catalyst prepared from ZSM-5 molecular sieves crystallized and synthesized with organic amine template agent has better reaction performance, the organic amine template agent results in severe environmental pollution and higher recovery cost during the synthesis. In U.S. Pat. No. 6,486,373, inorganic amines are used as the template agent for the synthesis of ZSM-5 molecular sieves. However, the silica/alumina ratio of the surface of the synthesized molecular sieves is greatly different from that of the frame thereof. Upon modification, ZSM-5 molecular sieves synthesized thereby have worse reaction performance than ZSM-5 synthesized using organic amine template agent. The toluene conversion rate greatly decreases, while the para-selectivity of the modified catalysts sharply increases. That is to say, there is a so-called "inverse effect". The present invention is provided to solve the problems, such as a great deal of synthesized waste water present in the application of many organic amine template agents, higher production cost, worse comprehensive performance of the catalyst upon the modification of the molecular sieves synthesized by using inorganic amine template agents.

SUMMARY OF THE INVENTION

The present invention aims to solve the problems in the old technology, e.g., high requirements on the environment and great treatment of waste water containing organic amines when synthesizing ZSM-5 molecular sieves with an organic amine as the template agent; small and non-homogeneous particles when synthesizing ZSM-5 molecular sieves with an alcohol or ether as the template agent, such that the catalyst prepared thereby has low catalytic selectivity and low toluene conversion rate, etc. The present invention, thereby, provides a process for the manufacture of catalysts used for producing para-xylene by toluene shape selective alkylation. Said process is characterized with low cost of the starting materials for synthesis of ZSM-5 molecular sieves, simple post-treatment, and less environmental pollution. Moreover, the toluene selective disproportionating catalyst prepared with ZSM-5 molecular sieves synthesized by the process of the present invention has better comprehensive catalytic properties.

To solve the aforesaid technical problems, the following technical solution is used in the present invention. A process for the manufacture of catalysts used for producing para-xylene by toluene shape selective alkylation, comprising the steps of a) using silica sol, water glass or sodium silicate as a silica source, aluminium sulphate, sodium meta-aluminate or aluminate as an alumina source, and mixture of organic amine and alcohol or ether in a weight ratio of organic amine/alcohol or ether of 0.05-150 as a template agent to form a synthesis mixture having a molar ratio of $SiO_2/Al_2O_3=20\text{-}200$, $H_2O/SiO_2=30\text{-}140$, $NH_3/Al_2O_3=1\text{-}100$, $Na_2O/Al_2O_3=0\text{-}18$, hydrothermally-crystallizing the synthesis mixture at 120-200° C. for 10-200 hours to obtain the liquid product containing ZSM-5 molecular sieves;

b) filtering and washing said liquid product containing ZSM-5 molecular sieves from step a), and converting the molecular sieves to $NH_4$-type ZSM-5 molecular sieves by ion exchange;

c) adding at least one kneading agent selected from the group consisting of silica sol, aqueous organosilicon, silica gel and titanium white to $NH_4$-type ZSM-5 molecular sieves from said step b), shaping, drying and calcining to obtain a catalyst matrix; and d) modifying the catalyst matrix with at least one organosilicon selected from the group consisting of phenylmethylpolysiloxane, hydroxyl silicone oil, amino silicon oil and dimethyl silicon oil so as to support organosilicon on the surface of the molecular sieves, calcining at 300-600° C. for 0.5-12 hours, converting organosilicon to inorganic silicon to obtain a catalyst used for producing para-xylene by toluene shape selective alkylation.

In said technical solutions, the organic amine therein is at least one selected from the group consisting of diethylamine, propylamine, triethylamine, ethylamine, dipropylamine and tripropylammonium bromide, more preferably from the group consisting of ethylamine, triethylamine and mixtures thereof; the alcohol therein is selected from the group consisting of primary alcohol, secondary alcohol and mixtures thereof, wherein the primary alcohol is preferably selected from the group consisting of methanol and ethanol, and the secondary alcohol is preferably isopropanol; and the ether is selected from the group consisting of alkyl ether and mixtures thereof, more preferably from the group consisting of diethyl ether and dimethyl ether. The weight ratio of organic amine/alcohol in the template agent is 0.05-10:1, more preferably 0.1-1:1; and the weight ratio of organic amine/ether is 0.05-15:1, more preferably 0.1-5:1.

In said technical solutions, aluminum salts are selected from the group consisting of aluminum sulfate, aluminium nitrate and aluminium chloride; aluminates are selected from the group consisting of sodium meta-aluminate and potassium meta-aluminate. In order to speed up the crystallization synthesis velocity, ZSM-5 crystal powder synthesized according to the present invention may also be added as the seed crystal during the synthesis of ZSM-5 molecular sieves in an amount of 0.1-15 wt % of the final yield of ZSM-5 molecular sieves.

In response to the problems in the synthesis of ZSM-5 molecular sieves in the prior technology, the present invention proposes to mix organic amine template agents with alcohol or ether template agents to form a mixture as the template agent, in combination with the optimization of the synthesis conditions (water/silicon ratio, alkalinity, synthesis temperature and time), so as to control the synthesis of the specific ZSM-5 molecular sieves suitably used in the toluene selective alkylating catalysts. The method of the synthesis of ZSM-5 molecular sieves in the present invention is different from that of synthesis of ZSM-5 molecular sieves used in the toluene selective alkylating catalysts as stated in the previous patents mainly in that the template agent in the crystallization synthesis is the combined organic amine-alcohol template agent, or the combined organic amine-ether template agent; the molecular sieves synthesized thereby have a high crystallinity, and a relatively homogeneous crystal size, and can satisfy the requirments on the production of the toluene selective alkylating catalyst. Moreover, there are less waste water, waste gas and waste residue produced in the crystallization and synthesis, which are more environmentally friendly. ZSM-5 molecular sieves synthesized by said process are further surface-modified by atopic silicon precipitation, so that the catalysts prepared thereby have good catalytic activity and selectivity, and magnificently overcome said "inverse effect". Moreover, the comprehensive catalytic properties thereof are better than the catalysts prepared from ZSM-5 molecular sieves synthesized by other processes.

After the catalyst matrix is prepared from ZSM-5 molecular sieves synthesized by the process of the present invention by bonding and shaping, it is treated by atopic silicon precipitation, so as to prepared the toluene selective alkylating catalyst.

The term atopic silicon precipitation means dissolving organosilicon compounds such as phenylmethylpolysiloxane and the like in a solvent such as n-hexane, wherein the ratio of phenylmetbylpolysiloxane to solvent is from 0.01 to 10 in g phenylmethylpolysiloxane/ml solvent. Then, the shaped catalyst is added to said solution, wherein the ratio of solution to catalyst is from 0.1 to 30 in ml solution/g catalyst. The solvent is removed, and the catalyst is calcined after being cooled to room temperature. The aforesaid steps may be conducted many times, so as to obtain the catalysts having a high para-position selectivity.

On the fixed-bed reaction evaluation device is conducted the evaluation of the reaction activity and selectivity for the toluene shape selective alkylating catalysts, wherein the reaction is conducted at a weight space velocity of 4.0 h$^{-1}$, a temperature of 440° C., a pressure of 0.5 MPa, and a hydrogen/hydrocarbon molar ratio of 2.

The process of the present invention can be used to prepare the catalysts used for producing para-xylene catalyst by toluene shape selective alkylation, and said catalysts are characterized with high conversion rate and selectivity (toluene conversion rate >30%, and toluene selectivity in xylene mixtures >90%), so as to achieve better technical effects.

The following examples further illustrate the invention.

EMBODIMENTS

Example 1

350 g of water was added to 500 g of water glass (containing 26.1 wt % of SiO$_2$ and 7.4 wt % of Na$_2$O), and then homogeneously stirred. 35 g of aluminum sulfate octadecahydrate and 20 g of 98% concentrated sulfuric acid were dissolved in 600 g of water, and then were added to water glass. After being stirred for 15 minutes, the mixture was transferred to a stainless steel reaction vessel having a volume of 2 liters, to which 200 ml of tripropylammonium bromide and 25 ml of ethanol were added. The resulting mixture was crystallized at 170° C. for 60 hours, and the crystallized product was filtered, washed with water several times, dried, and identified as ZMS-5 molecular sieves by X-ray phase. The analytical results were consistent with the data in the ZSM-5 reference documents.

| d (Å) | 11.4 | 10.3 | 3.9 | 3.8 | 3.7 |
|---|---|---|---|---|---|
| I/I$_0$ | strong | strong | strong | very strong | strong |

Sodium-type ZSM-5 synthesized thereby was exchanged to ammonium-type by the conventional method, and the silica-alumina ratio thereof was determined by chemical analysis to be 35.

25 g of silica sol (containing 40 wt % of SiO$_2$) and 6 ml of water were added to 40 g of the initial powder of ammnonium-type ZSM-5. The mixture was kneaded and shaped, and dried and calcined at 500° C. for 2 hours, so as to obtain the shaped catalyst matrix A which was not treated by shape selection.

Example 2

450 g of water was added to 600 g of water glass (containing 25.8 wt % of SiO$_2$ and 7.3 wt % of Na$_2$O), and then homogeneously stirred. 10 g of sodium meta-aluminate and 600 g of water were added to said water glass. After being stirred for 15 minutes, the mixture was transferred to a stainless steel reaction vessel having a volume of 2 liters, and the tank was sealed after 20 g of diethylamine and 30 g of methanol were added therein. The resulting mixture was crystallized at 170° C. for 60 hours, and the crystallized product was filtered, washed with water several times, dried, and identified as ZMS-5 molecular sieves by X-ray phase.

450 g of water was added to 600 g of water glass (containing 25.8 wt % of SiO$_2$ and 7.3 wt % of Na$_2$O), and then homogeneously stirred. 10 g of sodium meta-aluminate, 600 g of water and 5 g of crystal powder synthesized according to the aforesaid step in this example were added to said water glass. After being stirred for 15 minutes, the mixture was transferred to a stainless steel reaction vessel having a volume of 2 liters, and the tank was sealed after 20 g of diethylamine and 30 g of methanol were added therein. The resulting mixture was crystallized at 170° C. for 60 hours, and the crystallized product was filtered, washed with water several times, dried, and identified as ZMS-5 molecular sieves by X-ray phase. The silica-alumina ratio of the molecular sieve frame obtained thereby was 75. Sodium-type ZSM-5 synthesized thereby was exchanged to ammonium-type by the conventional method.

15 g of titanium white and 6 ml of water were added to 40 g of the initial powder of ammonium-type ZSM-5. The mixture was kneaded and shaped, and dried and calcined at 500° C. for 2 hours, so as to obtain the shaped catalyst matrix B which was not treated by shape selection.

Example 3

450 g of water was added to 600 g of water glass (containing 25.2 wt % of $SiO_2$ and 7.2 wt % of $Na_2O$), and then homogeneously stirred. 10 g of aluminum sulfate octadecahydrate and 600 g of water were added to said water glass. After being stirred for 15 minutes, the mixture was transferred to a stainless steel reaction vessel having a volume of 2 liters, and the tank was sealed after 25 g of propylamine and 50 g of isopropanol solution were added therein. The resulting mixture was crystallized at 170° C. for 60 hours, and the crystallized product was filtered, washed with water several times, dried, and identified as ZMS-5 molecular sieves by X-ray phase.

450 g of water was added to 600 g of water glass (containing 25.2 wt % of $SiO_2$ and 7.2 wt % of $Na_2O$), and then homogeneously stirred. 10 g of aluminum sulfate octadecahydrate, 600 g of water and 5 g of crystal powder synthesized according to the aforesaid step in this example were added to said water glass. After being stirred for 15 minutes, the mixture was transferred to a stainless steel reaction vessel having a volume of 2 liters, and the tank was seated after 25 g of propylamine and 50 g of isopropanol solution were added therein. The resulting mixture was crystallized at 170° C. for 60 hours, and the crystallized product was filtered, washed with water several times, dried, and identified as ZMS-5 molecular sieves by X-ray phase. The silica-alumina ratio of the molecular sieve frame obtained thereby was 96. Sodium-type ZSM-5 synthesized thereby was exchanged to ammonium-type by the conventional method.

20 g of water-soluble organosilicon (containing 40 wt % of $SiO_2$) and 6 ml of water were added to 40 g of the initial powder of ammonium-type ZSM-5. The mixture was kneaded and shaped, and dried and calcined at 500° C. for 2 hours, so as to obtain the shaped catalyst matrix C which was not treated by shape selection.

Example 4

450 g of water was added to 600 g of water glass (containing 25.2 wt % of $SiO_2$ and 7.2 wt % of $Na_2O$), and then homogeneously stirred. 4 g of aluminum sulfate octadecahydrate and 600 g of water were added to said water glass. After being stirred for 15 minutes, the mixture was transferred to a stainless steel reaction vessel having a volume of 2 liters, and the tank was sealed after 8 g of ethylamine (65 wt %) and 65 g of ethanol solution were added therein. The resulting mixture was crystallized at 170° C. for 60 hours, and the crystallized product was filtered, washed with water several times, dried, and identified as ZMS-5 molecular sieves by X-ray phase.

450 g of water was added to 600 g of water glass (containing 25.2 wt % of $SiO_2$ and 7.2 wt % of $Na_2O$), and then homogeneously stirred. 4 g of aluminum sulfate octadecahydrate, 600 g of water and 5 g of crystal powder synthesized according to the aforesaid step in this example were added to said water glass. After being stirred for 15 minutes, the mixture was transferred to a stainless steel reaction vessel having a volume of 2 liters, and the tank was sealed after 8 g of ethylamine (65 wt %) and 65 g of ethanol solution were added therein. The resulting mixture was crystallized at 170° C. for 60 hours, and the crystallized product was filtered, washed with water several times, dried, and identified as ZMS-5 molecular sieves by X-ray phase. The silica-alumina ratio of the molecular sieve frame obtained thereby was 172. Sodium-type ZSM-5 synthesized thereby was exchanged to ammonium-type by the conventional method.

25 g of silica sol (containing 40 wt % of $SiO_2$) and 6 ml of water were added to 40 g of the initial powder of ammonium-type ZSM-5. The mixture was kneaded and shaped, and dried and calcined at 500° C. for 2 hours, so as to obtain the shaped catalyst matrix D which was not treated by shape selection.

Example 5

45 g of the catalyst matrix A was added to the solution formulated by 200 ml of n-hexane and 4.5 g of phenylmethylpolysiloxane, and the mixture was distilled by oil bath at 90° C. so as to remove n-hexane. The residues after distillation were heated to 500° C. for 3 hours in a muffle furnace, and then naturally cooled, so as to obtain the catalyst shape selective treated once by atopic silicon precipitation.

40 g of the catalyst treated once with organosilicon above was added to the solution formulated by 200 ml of n-hexane and 4.0 g of phenylmethylpolysiloxane, and the mixture was distilled by oil bath at 90° C. so as to remove n-hexane. The residues after distillation were heated to 550° C. for 3 hours in a muffle furnace, and then naturally cooled, so as to obtain the catalyst E shape selective treated twice by atopic silicon precipitation.

Example 6

A catalyst F shape selective treated twice by atopic silicon precipitation was prepared according to the process in Example 5 except that 45 g of the catalyst B was used to replace the catalyst matrix A, and dimethyl silicon oil was used to replace phenylmethylpolysiloxane.

Example 7

A catalyst G shape selective treated twice by atopic silicon precipitation was prepared according to the process in Example 5 except that 45 g of the catalyst C was used to replace the catalyst matrix A, and a mixture of benzyl silicon oil and dimethyl silicon oil was used to replace phenylmethylpolysiloxane.

Example 8

A catalyst H shape selective treated twice by atopic silicon precipitation was prepared according to the process in Example 5 except that 45 g of the catalyst D was used to replace the catalyst matrix A, and a mixture of dimethyl silicon oil and amino silicon oil was used to replace phenylmethylpolysiloxane.

Example 9

On the fixed-bed reaction evaluation device was conducted the evaluation of toluene shape selective alkylating reaction activity and selectivity for Catalysts A-H prepared in Examples 1-8. Catalysts were filled in an amount of 5.0 g. The reaction was conducted at a weight space velocity of $4.0\ h^{-1}$, a temperature of 440° C., a pressure of 0.5 MPa, and a the hydrogen/hydrocarbon molar ratio of 2. The reaction results are listed in Table 1 below.

Toluene Conversion Rate=[(Weight of toluene fed into the reactor—weight of toluene at the outlet of the reactor)/Weight of toluene fed into the reactor]×100%

Para-position Selectivity=(Weight of para-xylene at the outlet of the reactor/weight of xylene at the outlet of the reactor)×100%

TABLE 2

Evaluation Results

| Catalyst | Times of shape selective treatment | Toluene conversion rate % | Para-xylene selectivity % |
|---|---|---|---|
| A | 0 | 51.4 | 24.2 |
| B | 0 | 50.7 | 24.3 |
| C | 0 | 49.6 | 24.3 |
| D | 0 | 48.7 | 24.4 |
| E | 2 | 31.5 | 91.1 |
| F | 2 | 30.8 | 90.7 |
| G | 2 | 30.7 | 90.4 |
| H | 2 | 30.1 | 90.5 |

Comparative Example 1

50 g of silica sol (containing 40 wt % of $SiO_2$) and 10 ml of water were added to 80 g of ZSM-5 ammonium-type initial powder synthesized with commercially available ethylene diamine and having a silica/alumina ratio of 52. The mixture was then kneaded and shaped, and dried and calcined at 500° C. for 2 hours. The reaction of the catalyst which was not treated by shape selection was conducted according to the conditions as stated in Example 9. As a result, the toluene conversion rate thereof was 46.2 wt %, and the para-xylene selectivity was 24.3%.

A catalyst shape selective treated twice was prepared according to the process in Example 5 except that 45 g of said catalyst which was not treated by shape selection was used to replace the catalyst matrix A. The reaction thereof was conducted according to the conditions as stated in Example 9. As a result, the toluene conversion rate thereof was 25.4 wt %, and the para-xylene selectivity was 83.2%.

Comparative Example 2

50 g of silica sol (containing 40 wt % of $SiO_2$) and 10 ml of water were added to 80 g of ZSM-5 ammonium-type initial powder synthesized with commercially available propylamine and having a silica/alumina ratio of 100. The mixture was then kneaded and shaped, and dried and calcined at 500° C. for 2 hours. The reaction of the catalyst which was not treated by shape selection was conducted according to the conditions as stated in Example 9. As a result, the toluene conversion rate thereof was 45.4 wt %, and the para-xylene selectivity was 24.2%.

A catalyst shape selective treated twice was prepared according to the process in Example 5 except that 45 g of said catalyst which was not treated by shape selection was used to replace the catalyst matrix A. The reaction thereof was conducted according to the conditions as stated in Example 9. As a result, the toluene conversion rate thereof was 23.8 wt %, and the para-xylene selectivity was 86.3%.

Example 10

350 g of water was added to 500 g of water glass (containing 26.1 wt % of $SiO_2$ and 7.4 wt % of $Na_2O$), and then homogeneously stirred. 22 g of aluminum sulfate octadecahydrate and 20 g of 98% concentrated sulfuric acid were dissolved in 600 g of water, and then were added to water glass. After being stirred for 15 minutes, the mixture was transferred to a stainless steel reaction vessel having a volume of 2 liters, to which 8 of dimethyl ether and 70 g of ethylamine (65 wt %) were added therein. The resulting mixture was crystallized at 170° C. for 60 hours, and the crystallized product was filtered, washed with water several times, dried, and identified as ZMS-5 molecular sieves by X-ray phase. The analytical results were consistent with the data in the ZSM-5 reference documents.

| d (Å) | 11.4 | 10.3 | 3.9 | 3.8 | 3.7 |
|---|---|---|---|---|---|
| $I/I_0$ | strong | strong | strong | very strong | strong |

Sodium-type ZSM-5 synthesized thereby was exchanged to ammonium-type by the conventional method, and the silica-alumina ratio thereof was determined by chemical analysis to be 43.

25 g of silica sol (containing 40 wt % of $SiO_2$) and 6 ml of water were added to 40 g of the initial powder of ammonium-type ZSM-5. The mixture was kneaded and shaped, and dried and calined at 500° C. for 2 hours, so as to obtain the shaped catalyst matrix I which was not treated by shape selection.

Example 11

450 g of water was added to 600 g of water glass (containing 25.8 wt % of $SiO_2$ and 7.3 wt % of $Na_2O$), and then homogeneously stirred. 21 g of aluminum sulfate octadecahydrate, 25 g of 98% concentrated sulfuric acid and 600 g of water were added to said water glass. After being stirred for 15 minutes, the mixture was transferred to a stainless steel reaction vessel having a volume of 2 liters, and the tank was sealed after 50 g of diethyl ether and 17 g of triethylamine were added therein. The resulting mixture was crystallized at 170° C. for 60 hours, and the crystallized product was filtered, washed with water several times, dried, and identified as ZMS-5 molecular sieves by X-ray phase.

450 g of water was added to 600 g of water glass (containing 25.8 wt % of $SiO_2$ and 7.3 wt % of $Na_2O$), and then homogeneously stirred. 21 g of aluminum sulfate octadecahydrate, 25 g of 98% concentrated sulfuric acid, 600 g of water and 5 g of crystal powder synthesized according to the aforesaid step in this example were added to said water glass. After being stirred for 15 minutes, the mixture was transferred to a stainless steel reaction vessel having a volume of 2 liters, and the tank was sealed after 50 g of diethyl ether and 17 g of triethylamine were added therein. The resulting mixture was crystallized at 170° C. for 60 hours, and the crystallized product was filtered, washed with water several times, dried, and identified as ZMS-5 molecular sieves by X-ray phase. The silica-alumina ratio of the molecular sieve-frame obtained thereby was 65. Sodium-type ZSM-5 synthesized thereby was exchanged to ammonium-type by the conventional method.

16 g of aqueous organosilicon silica gel (containing 75 wt % of $SiO_2$) and 15 ml of water were added to 40 g of the initial powder of ammonium-type ZSM-5. The mixture was kneaded and shaped, and dried and calcined at 500° C. for 2 hours, so as to obtain the shaped catalyst matrix J which was not treated by shape selection.

Example 12

450 g of water was added to 600 g of water glass (containing 25.2 wt % of $SiO_2$ and 7.2 wt % of $Na_2O$), and then homogeneously stirred. 8 g of aluminum sulfate octadecahydrate, 25 g of 98% concentrated sulfuric acid and 600 g of water were added to said water glass. After being stirred for 15 minutes, the mixture was transferred to a stainless steel reaction vessel having a volume of 2 liters, and the tank was sealed after 80 g of diethyl ether and 15 g of dipropylamine were added therein. The resulting mixture was crystallized at 170° C. for 60 hours, and the crystallized product was filtered, washed with water several times, dried, and identified as ZMS-5 molecular sieves by X-ray phase.

450 g of water was added to 600 g of water glass (containing 25.2 wt % of $SiO_2$ and 7.2 wt % of $Na_2O$), and then homogeneously stirred. 8 g of aluminum sulfate octadecahydrate, 25 g of 98% concentrated sulfuric acid, 600 g of water and 5 g of crystal powder synthesized according to the aforesaid step in this example were added to said water glass. After being stirred for 15 minutes, the mixture was transferred to a stainless steel reaction vessel having a volume of 2 liters, and the tank was sealed after 80 g of diethyl ether and 15 g of dipropylamine were added therein. The resulting mixture was crystallized at 170° C. for 60 hours, and the crystallized product was filtered, washed with water several times, dried, and identified as ZMS-5 molecular sieves by X-ray phase. The silica-alumina ratio of the molecular sieve frame obtained thereby was 147. Sodium-type ZSM-5 synthesized thereby was exchanged to ammonium-type by the conventional method.

21 g of aqueous organosilicon (containing 56 wt % of $SiO_2$) and 9 ml of water were added to 40 g of the initial powder of ammonium-type ZSM-5. The mixture was kneaded and shaped, and dried and calcined at 500° C. for 2 hours, so as to obtain the shaped catalyst matrix K which was not treated by shape selection.

Example 13

450 g of water was added to 600 g of water glass (containing 25.2 wt % of $SiO_2$ and 7.2 wt % of $Na_2O$), and then homogeneously stirred. 15 g of aluminum sulfate octadecahydrate, 25 g of 98% concentrated sulfuric acid and 600 g of water were added to said water glass. After being stirred for 15 xninutes, the mixture was transferred to a stainless steel reaction vessel having a volume of 2 liters, and the tank was sealed after 10 g of dimethyl ether and 10 g of propylamine were added therein. The resulting mixture was crystallized at 170° C. for 60 hours, and the crystallized product was filtered, washed with water several times, dried, and identified as ZMS-5 molecular sieves by X-ray phase.

450 g of water was added to 600 g of water glass (containing 25.2 wt % of $SiO_2$ and 7.2 wt % of $Na_2O$), and then homogeneously stirred. 15 g of aluminum sulfate octadecahydrate, 25 g of 98% concentrated sulfuric acid, 600 g of water and 5 g of crystal powder synthesized according to the aforesaid step in this example were added to said water glass. After being stirred for 15 minutes, the mixture was transferred to a stainless steel reaction vessel having a volume of 2 liters, and the tank was sealed after 10 g of dimethyl ether and 10 g of propylamine were added therein. The resulting mixture was crystallized at 170° C. for 60 hours, and the crystallized product was filtered, washed with water several times, dried, and identified as ZMS-5 molecular sieves by X-ray phase. The silica-alumina ratio of the molecular sieve frame obtained thereby was 125. Sodium-type ZSM-5 synthesized thereby was exchanged to ammonium-type by the conventional method.

15 g of titanium white (containing 76 wt % of $TiO_2$) and 11 ml of water were added to 40 g of the initial powder of ammonium-type ZSM-5. The mixture was kneaded and shaped, and dried and calcined at 500° C. for 2 hours, so as to obtain the shaped catalyst matrix L which was not treated by shape selection.

Example 14

45 g of the catalyst matrix I was added to the solution formulated by 200 ml of n-hexane and 4.5 g of phenylmethylpolysiloxane, and the mixture was distilled by oil bath at 90° C. so as to remove n-hexane. The residues after distillation were heated to 500° C. for 3 hours in a muffle furnace, and then naturally cooled, so as to obtain the catalyst shape selective treated once by atopic silicon precipitation.

40 g of the catalyst treated once with organosilicon above was added to the solution formulated by 200 ml of n-hexane and 6.0 g of phenylmethylpolysiloxane, and the mixture was distilled by oil bath at 90° C. so as to remove n-hexane. The residues after distillation were heated to 550° C. for 3 hours in a muffle furnace, and then naturally cooled, so as to obtain the catalyst M shape selective treated twice by atopic silicon precipitation.

Example 15

A catalyst N shape selective treated twice by atopic silicon precipitation was prepared according to the process in Example 14 except that 45 g of the catalyst J was used to replace the catalyst matrix I, and hydroxyl silicon oil was used to replace phenylmethylpolysiloxane.

Example 16

A catalyst O shape selective treated twice by atopic silicon precipitation was prepared according to the process in Example 14 except that 45 g of the catalyst K was used to replace the catalyst matrix I, and amino silicon oil was used to replace phenylmethylpolysiloxane.

Example 17

A catalyst P shape selective treated twice by atopic silicon precipitation was prepared according to the process in Example 14 except that 45 g of the catalyst L was used to replace the catalyst matrix I, and dimethyl silicon oil was used to replace phenylmethylpolysiloxane.

Example 18

On the fixed-bed reaction evaluation device was conducted the evaluation of toluene methylating reaction activity and selectivity for Catalysts I-P prepared in Examples 10-17. Catalysts were filled in an amount of 5.0 g. The reaction was conducted at a weight space velocity of 4.0 h$^{-1}$ a temperature of 440° C., a pressure of 0.5 MPa, and a hydrogen/hydrocarbon molar ratio of 2. The reaction results are listed in Table 2 below.

Toluene Conversion Rate=[(Weight of toluene fed into the reactor—weight of toluene at the outlet of the reactor)/Weight of toluene fed into the reactor]×100%

Para-position Selectivity=(Weight of para-xylene at the outlet of the reactor/weight of xylene at the outlet of the reactor)×100%

TABLE 2

Evaluation Results

| Catalyst | Times of shape selective treatment | Toluene conversion rate % | Para-xylene selectivity % |
| --- | --- | --- | --- |
| I | 0 | 51.1 | 24.2 |
| J | 0 | 50.2 | 24.3 |
| K | 0 | 49.3 | 24.2 |
| L | 0 | 48.5 | 24.3 |
| M | 2 | 31.7 | 91.2 |
| N | 2 | 30.8 | 90.7 |
| O | 2 | 30.0 | 90.4 |
| P | 2 | 29.5 | 90.3 |

Comparative Example 3

50 g of silica sol (containing 40 wt % of SiO$_2$) and 10 ml of water were added to 80 g of ZSM-5 ammonium-type initial powder synthesized with 28 wt % of commercially available ammonia and having a silica/alumina ratio of 30. The mixture was then kneaded and shaped, and dried and calcined at 500° C. for 2 hours. The reaction of the catalyst which was not treated by shape selection was conducted according to the conditions as stated in Example 18. As a result, the toluene conversion rate thereof was 47.5 wt %, and the para-xylene selectivity was 24.3%.

A catalyst shape selective treated twice was prepared according to the process in Example 14 except that 45 g of said catalyst which was not treated by shape selection was used to replace the catalyst matrix I. The reaction thereof was then conducted according to the conditions as stated in Example 18. As a result, the toluene conversion rate thereof was 28.4 wt %, and the para-xylene selectivity was 84.9%.

Comparative Example 4

50 g of silica sol (containing 40 wt % of SiO$_2$) and 10 ml of water were added to 80 g of ZSM-5 ammonium-type initial powder synthesized with commercially available liquid ammonia and having a silica/alumina ratio of 58. The mixture was then kneaded and shaped, and dried and calcined at 500° C. for 2 hours. The reaction of the catalyst which was not treated by shape selection was conducted according to the conditions as stated in Example 18. As a result, the toluene conversion rate thereof was 46.6 wt %, and the para-xylene selectivity was 24.2%.

A catalyst shape selective treated twice was prepared according to the process in Example 14 except that 45 g of said catalyst which was not treated by shape selection was used to replace the catalyst matrix I. The reaction thereof was then conducted according to the conditions as stated in Example 18. As a result, the toluene conversion rate thereof was 27.3 wt %, and the para-xylene selectivity was 87.1%.

What is claimed. is:

1. A process for the manufacture of catalysts used for producing para-xylene by toluene shape selective alkylation, comprising the steps of
   e) using silica sol, water glass or sodium silicate as a silica source, aluminium sulphate, sodium meta-aluminate or aluminates as an alumina source, and mixture of organic amine and alcohol or ether in a weight ratio of organic amine/alcohol or ether of 0.05-150 as a template agent to form a synthesis mixture having a molar ratio of SiO$_2$/Al$_2$O$_3$=20-200, H$_2$O/SiO$_2$=30-140, NH$_3$/Al$_2$O$_3$=1-100, Na$_2$O/Al$_2$O$_3$=0-18, hydrothermally-crystallizing the synthesis mixture at 120-200° C. for 10-200 hours to obtain the liquid product containing ZSM-5 molecular sieves;
   f) filtering and washing said liquid product containing ZSM-5 molecular sieves from step a), and converting the molecular sieves to NH$_4$-type ZSM-5 molecular sieves by ion exchange;
   g) adding at least one kneading agent selected from the group consisting of silica sol, aqueous organosilicon, silica gel and titanium white to NH$_4$-type ZSM-5 molecular sieves from said step b), shaping, drying and calcining to obtain a catalyst matrix; and
   h) modifying the catalyst matrix with at least one organosilicon selected from the group consisting of phenylmethylpolysiloxane, hydroxyl silicone oil, amino silicon oil and dimethyl silicon oil so as to support organosilicon on the surface of the molecular sieves, calcining at 300-600° C. for 0.5-12 hours, converting organosilicon to inorganic silicon to obtain a catalyst used for producing para-xylene by toluene shape selective alkylation.

2. The process according to claim 1, characterized in that the organic amine therein is at least one selected from the group consisting of diethylamine, propylamine, triethylamine, ethylamine, dipropylamine and tripropylammonium bromide; the alcohol therein is selected from the group consisting of primary alcohol, secondary alcohol and mixtures thereof; the ether is selected from the group consisting of alkyl ether and mixtures thereof.

3. The process according to claim 2, characterized in that the organic amine is selected from the group consisting of ethylamine, triethylamine and mixtures thereof; the primary alcohol is selected from the group consisting of methanol and ethanol; the secondary alcohol is isopropanol; and the ether therein is selected from the group consisting of diethyl ether and dimethyl ether.

4. The process according to claim 1, characterized in that the organic amine/alcohol is in a weight ratio of 0.05-10:1.

5. The process according to claim 4, characterized in that the organic amine/alcohol is in a weight ratio of 0.1-1:1.

6. The process according to claim 1, characterized in that the organic amine/ether is in a weight ratio of 0.05-15:1.

7. The process according to claim 1, characterized in that the organic amine/ether is in a weight ratio of 0.1-5:1.

* * * * *